United States Patent [19]

Kantner et al.

[11] Patent Number: 5,032,460
[45] Date of Patent: Jul. 16, 1991

[54] METHOD OF MAKING VINYL-SILICONE COPOLYMERS USING MERCAPTO FUNCTIONAL SILICONE CHAIN-TRANSFER AGENTS AND RELEASE COATINGS MADE THEREWITH

[75] Inventors: Steven S. Kantner, St. Paul; Ramesh C. Kumar, Maplewood; Gilbert L. Eian, Mahtomedi, all of Minn.

[73] Assignee: Minnesota Mining and Manufacturing Company, St. Paul, Minn.

[21] Appl. No.: 393,554

[22] Filed: Aug. 14, 1989

[51] Int. Cl.$^5$ .................................... B32B 9/04
[52] U.S. Cl. ....................... 428/449; 528/12; 528/23; 528/24; 528/30; 528/25; 526/194
[58] Field of Search ............. 528/30, 12, 25, 23, 528/24; 526/194; 428/447

[56] References Cited

U.S. PATENT DOCUMENTS

| | | | |
|---|---|---|---|
| 2,532,011 | 11/1950 | Dahlquist et al. | 154/53.5 |
| 2,607,711 | 8/1952 | Hendricks | 117/122 |
| 2,829,073 | 4/1958 | Williams | 117/161 |
| 2,985,554 | 5/1961 | Dickard | 154/53.5 |
| 3,318,852 | 5/1967 | Dixon | 260/78.5 |
| 3,502,497 | 3/1970 | Crocker | 117/68.5 |
| 3,679,458 | 7/1972 | Sorell et al. | 117/68.5 |
| 3,770,687 | 11/1973 | Mestetsky | 260/30.45 B |
| 3,823,025 | 7/1974 | Mestetsky | 117/68.5 |
| 3,933,702 | 1/1976 | Caimi et al. | 260/17 R |
| 3,957,724 | 5/1976 | Schurb et al. | 260/46.5 E |
| 4,046,795 | 9/1977 | Martin | 260/448.2 E |
| 4,169,115 | 9/1979 | Tung et al. | 525/314 |
| 4,238,393 | 12/1980 | Takamizawa et al. | 260/22 S |
| 4,239,674 | 12/1980 | Homan et al. | 260/37 S D |
| 4,241,198 | 12/1980 | Kobayashi | 525/360 |
| 4,261,876 | 4/1981 | Reusser | 260/33.6 |
| 4,313,988 | 2/1982 | Koshar et al. | 428/40 |
| 4,486,577 | 12/1984 | Mueller et al. | 524/474 |
| 4,584,356 | 4/1986 | Crivello | 525/479 |
| 4,677,169 | 6/1987 | Crivello | 525/479 |
| 4,689,289 | 8/1987 | Crivello | 430/270 |
| 4,725,630 | 2/1988 | Magee et al. | 522/99 |
| 4,728,571 | 3/1988 | Clemens et al. | 428/352 |
| 4,783,490 | 11/1988 | Eckberg et al. | 522/99 |

FOREIGN PATENT DOCUMENTS 1233290 1/1990 Canada .
0250248 12/1987 European Pat. Off. .
6357642 8/1986 Japan .

OTHER PUBLICATIONS

Nair et al., Macromolecules 1990, 23, pp. 1361–1369.
CA Selects: Siloxanes & Silicones, Issue 24, 1989, pp. 7–8.
D. Satas, Chapt. 23, "Release Coatings", *Handbook of Pressure Sensitive Adhesive Technology*, Second Edition, D. Satas, ed., Van Nostrand Reinhold, (1989).
Journal of Applied Polymer Science, 35, 2039 (1988).
S. P. Pappas, J. Rad. Cur., (Jul. 1987), p. 6.
JPS, Poly. Chem, 24, 197 and 1251 (1986).
Makromol. Chem., 185, 9 (1984).
Journal of Applied Polymer Science, 18, 2279–2285 (1974).
Pape and Stewart Rubb Chem. Tech. 46, 585 (1973).

*Primary Examiner*—Melvyn I. Marquis
*Attorney, Agent, or Firm*—Gary L. Griswold; Walter N. Kirn; Janice L. Dowdall

[57] ABSTRACT

A method of preparing vinyl-silicone copolymers which involves the use of a mercapto-functional silicone compound as a macromolecular chain transfer agent. Release coatings and low adhesion backsizes comprising the vinyl-silicone copolymers.

14 Claims, No Drawings

METHOD OF MAKING VINYL-SILICONE COPOLYMERS USING MERCAPTO FUNCTIONAL SILICONE CHAIN-TRANSFER AGENTS AND RELEASE COATINGS MADE THEREWITH

FIELD OF THE INVENTION

This invention relates to a novel method of preparing vinyl-silicone copolymers which involves the free-radical polymerization of unsaturated monomers in the presence of a mercapto functional silicone macromolecular chain-transfer agent.

This invention also relates to low adhesion backsize and release coatings of the type employed in connection with normally tacky and pressure-sensitive adhesive tape. The invention also relates to adhesive-coated sheet material provided with such coatings.

BACKGROUND OF THE INVENTION

Block and graft copolymers of silicone and vinyl monomers combine the properties of two dissimilar polymers providing unique materials which potentially have broad utility in a number of areas including release coatings for pressure-sensitive adhesives, and permselective membranes. Such polymers find use in applications that require the combination of the unique properties of the silicone with those of the vinyl polymer. Such applications include permselective membranes (Mueller et al., U.S. Pat. No. 4,486,577), photoresists (U.S. Pat. No. 4,689,289 to Crivello), electron beam resists, (M. J. Bowden, et al., Polymeric Materials Science and Engineering, 55, 298 (1986)), and release coatings for pressure sensitive adhesives (Clemens, U.S. Pat. No. 4,728,571). According to the teaching of Clemens, the copolymer should contain little or no unincorporated silicone, otherwise loss of adhesive performance is observed.

General methods of preparing such materials have only recently been described. Kawakami (Makromol. Chem., 185 9 (1984)), teaches the preparation of a vinyl polymeric backbone grafted with silicone polymeric segments in a comb-like structure by copolymerizing a silicone macromonomer with vinyl monomers.

A thermal method involving the use of a macromolecular siloxane initiator is disclosed in Crivello U.S. Pat. No. 4,584,356. Crivello utilizes a macromolecular siloxane thermal initiator which, due to termination by coupling of the growing polymer radicals, leads to a segmented $(AB)_n$ block copolymer. Crivello describes utility of the copolymer thus formed as E-beam resists (U.S. Pat. No. 4,677,169) and positive and negative resists (U.S. Pat. No. 4,689,289).

A photochemical method involving the use of a macromolecular siloxane iniferter is described in concurrently filed copending U.S. patent application Kumar, et al., Siloxane Iniferter Compounds, Block Copolymers Made Therewith and a Method of Making the Block Copolymers (assigned to the assignee of the present case). Kumar, et al., teaches polymerization of vinyl monomers with a novel siloxane "iniferter" which, unlike Crivello, yields ABA or AB type block polymers due to the presence of a reactive terminating radical which minimizes coupled between the two polymeric radicals.

These preparative methods are not without their drawbacks. Crivello's method requires an elaborate synthesis of the siloxane initiator and based on the mechanism presented by Crivello (JPS, Poly. Chem, 24, 197 & 1251 (1986)), initiator fragments exist between the siloxane and vinyl blocks, creating a weak link which on aging may release free silicone. The photoiniferter method generates quality material which performs very well when tested as a release coating. However, because of the photopolymerization required, some potential producers are ill-equipped to manufacture this material in a cost-effective manner.

Inoue and Kohama (Kagaku to Kogye (Osaka), 1986, 60 (3), 81 (Chem Abs. 105:1735345)) discloses the grafting of vinyl monomers to a silicone backbone to yield a comblike structure with the roles of silicone and vinyl reversed from those of Clemens, wherein grafting occurs concomitantly with gel formation and wherein UV radiation is utilized to initiate polymerization.

Block polymers are also prepared from silicone macroinitiators containing labile peroxy ester (JP 63 57,642, publication date Mar. 12, 1988, and 57,644, publication date Mar. 12, 1988,) or azo (Inoue and Ueda, Journal of Applied Polymer Science, 35, 2039, (1988)) functionality, or by the coupling of a preformed monofunctional vinyl polymeric segment with a difunctional siloxane. In this latter case, the use of a mono hydroxy (DE 3,606,984), publication date Sept. 10, 1987, or carboxy (DE 3,606,983), publication date Sept. 10, 1987, terminal vinyl polymeric segment precludes the presence of similar functionalities on the polymer which would interfere with the coupling reaction.

Saam and Tsai, Journal of Applied Polymer Science, 18, 2279–2285 (1974), have utilized silicone modified with mercapto alkyl side groups to prepare stable dispersions during the free-radical polymerization of methyl methacrylate in aliphatic hydrocarbons. The silicone is grafted with vinyl monomer via a chain transfer reaction, with less than 50% of the charged silicone being grafted. This is due to high degree of insolubility of polydimethylsiloxane (PDMS) in the polymethyl methacrylate (PMMA) particles. As a result, the reactive sites on the dissolved stabilizer precursor are inaccessible to the growing polymeric radicals during the later stages of polymerization.

Mercaptoalkyl functional silicones are commercially available and find use as additives in vulcanized elastomers (Pape and Stewart Rubb Chem. Tech. 46, 585, (1973)), for preparation of curable siloxanes by Michael reaction with multifunctional acrylates (U.S. Pat. No. 4,725,630), for curing without modification (U.S. Pat. No. 4,239,674), and for cocuring with vinyl functional siloxanes (Eckberg et al., Canadian Patent 1233290).

A number of references describe the preparation of mercapto-functional silicone compounds. U.S. Pat. No. 4,238,393 describes the preparation of organopolysiloxanes containing one or more pendant or terminal mercapto groups by, for example, an acid-catalyzed coequilibration reaction of a hydrosylate of dialkoxy mercaptoalkyl silane with octamethylcyclotetrasiloxane and hexamethyldisiloxane endblocker and its use as an additive in coating compositions to impart anti-blocking behavior.

U.S. Pat. No. 4,046,795 describes a process for the preparation of thiofunctional polysiloxane polymers by reacting a disiloxane and/or a hydroxy or hydrocarbonoxy containing silane or siloxane with a cyclic trisiloxane in the presence of an acid catalyst wherein at least one of the above organosilicon compounds contain a thiol group.

U.S. Pat. No. 4,783,490 describes the preparation of mercapto substituted silicon compounds by amidizing an aminofunctional silicon compound with a mercapto carboxylate.

Canadian Patent No. 1,233,290 describes the preparation of mercapto-alkoxyalkyl-functional siloxanes by displacement of a haloalkyl functional siloxane with a hydroxyl functional thiol.

The above mercapto functional silicone references do not teach the use of mercapto functional silicones as chain transfer agents in the preparation of vinyl silicone copolymers.

Tung, U.S. Pat. No. 4,169,115 teaches the preparation of terminally mercaptofunctional anionic polymers (e.g., polystyrene, polybutadiene, etc.) and their use as macromolecular chain transfer agents in free radical polymerizations in order to prepare block copolymers. Tung does not teach the preparation of vinyl-silicone copolymers.

Thus, a need therefore exists for a convenient cost effective general method of synthesizing high quality vinyl-silicone copolymers which does not require expenditures for expensive equipment.

As indicated above, copolymers of silicone and vinyl monomers have potential utility in the area of release coatings for pressure sensitive adhesives. Normally tacky and pressure-sensitive adhesive (PSA) materials have been used for well over half a century. Products of this type, which take the form of tapes, labels, and other types of adhesive coated sheets, must be protected from unintended adhesion to other surfaces. Hence, tapes are typically wound into a roll on their own backing and labels are typically laminated to a release sheet to prevent their accidental adhesion to other surfaces and also to prevent their contamination with air-borne dust and other contaminants. In order to allow the roll to be unwound without the undesirable transfer of adhesive to the tape backing, it is customary to provide the tape backing with a low adhesion backsize (LAB). Similarly, the release sheet or liner to which the adhesive coated label is typically laminated is supplied with a release coating to permit the easy removal of the liner from the label.

This LAB or release coating is expected to reproducibly provide an appropriate level of release to the adhesive of interest, to not deleteriously affect the adhesive, and to be resistant to aging so that the release level remains relatively stable with time. In recent years, as competition has expanded in the PSA industry, a need to differentiate product performance as well as more demanding product requirements has lead to recognition of the importance of release level. D. Satas, Chapt. 23 "Release Coatings", *Handbook of Pressure Sensitive Adhesive Technology*, Second Edition, D. Satas, ed., Van Nostrand Reinhold, 1989, defines seven distinct levels of release, ranging from "super low release" (0.15–0.30 N/dm) to "very tight release" (20–80 N/dm). Even within a given category, such as "moderately tight release" (6-10 N/dm), consumer preference demands a tighter unwind for a roll of office tape in Europe and Japan than in North America, allowing the manufacturer who has a means of easily adjusting the level of release the opportunity to compete on a global basis.

In many circumstances it is important for the LAB to possess other properties besides functioning as a release agent. For example, the release coating on masking tape must possess good solvent resistance in addition to providing a surface to which paint can adhere.

Polymers with long straight chain hydrocarbon branches find widespread use as low adhesion backsizes for pressure sensitive tapes. The alkyl side chain of these acrylate (U.S. Pat. No. 2,607,711), methacrylate (U.S. Pat. No. 3,502,497 and U.S. Pat. No. 4,241,198) vinyl ester (U.S. Pat. No. 2,829,073), vinyl carbamate (U.S. Pat. No. 2,532,011), etc., copolymers apparently crystallizes to form a waxy low energy surface to which the adhesive adheres poorly. These various polymeric release coatings are not universal, in that none of them show desirable release performance for every type of PSA. In addition, the range of release level possible with these polymers is fairly limited.

Fluorocarbon copolymers also provide low surface energy coatings which find utility in certain specialty applications (U.S. Pat. No. 3,318,852), but also lack universality and release level tailorability.

Silicones are widely used for release liner applications due to the fact that they provide easy release for a wide variety of PSA types. Silicones are generally less useful as LABs in tape constructions, however, where tighter release levels are desirable. To increase their usefulness in LAB tape constructions, organosiloxane has been blended with a variety of film forming coating materials such as nitrocellulose (U.S. Pat. No. 2,985,554), alkyl ether-maleic anhydride copolymers (U.S. Pat. No. 3,770,687 and U.S. Pat. No. 3,823,025), vinyl alkyl carbamate copolymers (U.S. Pat. No. 3,679,458), etc., to tighten release. In addition silicones can be modified with epoxy groups to make them more polar (U.S. Pat. No. 4,313,988) hence providing tighter release. Silicones can also be cocured with isocyanates (U.S. Pat. No. 3,957,724), polybutadiene (U.S. Pat. No. 4,261,876), acrylic emulsions (U.S. Pat. No. 3,933,702), etc., to tighten release.

Release coating compositions based on polysiloxane grafted copolymers that do not require a curing step have been described (U.S. Pat. No. 4,728,571) (assigned to the assignee of the present case wherein controlled and predictable release is achieved through variation in the number and the length of the polysiloxane grafts.

Polymers having at least one polymeric siloxane segment and at least one hydrophilic vinyl polymeric segment prepared by other means than by use of the so-called chain-transfer method have been shown to demonstrate utility as release coatings that are capable of being written on effectively with water and oil based pen inks as described in copending U.S. patent application Mertens, Ser. No. 07/278,283, filed Nov. 30, 1988, (assigned to the assignee of the present case). Mertens does not teach a method for the preparation of vinyl siloxane block or graft copolymers by use of a mercapto functional silicone chain transfer agent nor does it disclose the use of materials prepared by such a method as general purpose release coatings.

An article by Noshay and McGrath, entitled "Block Copolymers", Academic Press, New York, 1977 pp. 156-162, which is hereby incorporated by reference, discusses phase separation as it applies to silicone-vinyl block copolymers. Noshay does not teach the preparation of silicone-vinyl block copolymers by the use of a mercapto functional silicone compound chain transfer agent.

Copending, concurrently filed, U.S. application 07/393,550, Kumar et al, Siloxane Iniferter Compounds, Block Copolymers Made Therewith, and a Method of Making The Block Copolymers, discussed previously, teaches the utilization of a novel siloxane iniferter compound as a means of promoting, controlling and terminating polymerization of a vinyl-siloxane block copolymer.

Copending, concurrently filed, U.S. application 07/393,557, Kumar, et al, General Purpose Siloxane Release Coatings (also assigned to the assignee of the present case) teaches the use of the iniferter prepared vinyl-siloxane block copolymers as release coatings.

However, none of the aforementioned references teaches a method of preparing a soluble vinyl-silicone block copolymer or graft copolymer utilizing a mercapto functional silicone compound chain transfer agent wherein the resultant copolymer has utility as a release coating for pressure sensitive adhesives.

Thus, in addition to the need which exists for a cost-effective, convenient route of synthesis for vinyl-silicone copolymers, a need also exists for sheet materials having release coatings of conveniently prepared vinyl-siloxane copolymers and tape constructions having low adhesion backsizes of the same copolymers. The copolymers which, in addition to being reliably produced, should exhibit specific release properties toward tacky and pressure-sensitive adhesives throughout a broad range.

BRIEF DESCRIPTION OF THE INVENTION

We have found a method of synthesizing vinyl-silicone copolymers which comprises (a) mixing (1) free radically polymerizable monomer, mixed, if needed, with sufficient solvent to produce a charge which possesses a net dielectric constant greater than about 2.5, (2) a mercapto functional silicone compound represented by the formula

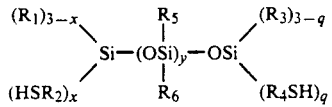

wherein
- $R_1$ are monovalent moieties which can independently be the same or different and are selected from the group consisting of alkyl, aryl, alkaryl, alkoxy, alkylamino, hydroxyl, hydrogen, and fluoroalkyl;
- $R_2$ can independently be the same or different and are divalent linking groups;
- $R_3$ are monovalent moieties which can independently be the same or different and are selected from the group consisting of alkyl, aryl, alkaryl, alkoxy, alkylamino, hydroxyl, hydrogen, and fluoroalkyl;
- $R_4$ can independently be the same or different and are divalent linking groups;
- $R_5$ are monovalent moieties which can independently be the same or different and are selected from the group consisting of alkyl, aryl, alkaryl, alkoxy, alkylamino, hydroxyl, fluoroalkyl, hydrogen, and -ZSH, wherein Z is a divalent linking group;
- $R_6$ are monovalent moieties which can independently be the same or different and are selected from the group consisting of alkyl, aryl, alkaryl, alkoxy, alkylamino, hydroxyl, fluoroalkyl, hydrogen, and -ZSH, wherein Z is a divalent linking group;
- x is an integer of 0-3;
- y is an integer of 10 or greater;
- q is an integer of 0-3;
- $R_5$ comprises 0-y -ZSH moieties;
- $R_6$ comprises 0-y wherein at least one of the following is true:
- q is an integer of at least 1;
- x is an integer of at least 1;
- $R_5$ comprises at least one -ZSH moiety;
- $R_6$ comprises at least one -ZSH moiety; and (3) an initiator capable of forming free radicals upon being subjected to a means of initiation, wherein the free radicals are capable of abstracting the -SH hydrogen atoms of the mercapto functional silicone compound to form mercapto functional silicone free radicals, wherein the mercapto functional silicone free radicals are capable of initiating free radical polymerization of the free radically polymerizable monomer to form a graft copolymer or block copolymer represented by the formula:

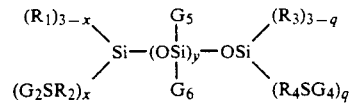

wherein
- $G_5$ are monovalent moieties which can independently be the same or different selected from the group consisting of alkyl, aryl, alkaryl, alkoxy, alkylamino, fluoroalkyl, hydrogen, and -ZSA;
- A is a vinyl polymeric segment consisting essentially of polymerized free radically polymerizable monomer;
- $G_6$ are monovalent moieties which can independently be the same or different selected from the group consisting of alkyl, aryl, alkaryl, alkoxy, alkylamino, fluoroalkyl, hydrogen, and -ZSA;
- $G_2$ comprises A;
- $G_4$ comprises A; and
- $R_1 R_2$, $R_3$, $R_4$, x, g, y, and Z are as previously defined;

(b) initiating free-radical polymerization; and (c) sustaining the free-radical polymerization until the vinyl-silicone copolymer is produced.

The preferred means of initiating is selected from the group consisting of thermolysis, photolysis and catalysis.

The invention further provides the vinyl-silicone copolymers of the formula noted above.

Yet another aspect of the invention relates to a coated sheet material comprising a flexible sheet and a release coating covering at least a portion of one major surface of the flexible sheet wherein the release coating comprises the vinyl-silicone copolymer formed according to the above described method and wherein A comprises at least about 40 weight percent of the copolymer and possesses a Tg or Tm above about $-20°$ C., and wherein a silicone segment of the copolymer has a number average molecular weight above about 1000, preferably above about 3000, and wherein the silicone segment is present at a weight percent great enough to provide the copolymer with a surface release value not greater than about 50 Newtons/dm.

DETAILED DESCRIPTION OF THE INVENTION

The method of the present invention involves the use of a mercapto functional silicone chain transfer agent in the polymerization of vinyl-silicone copolymers. The terms "mercapto functional silicone compound" "mercapto functional silicone chain transfer agent", and "mercapto functional silicone macromolecular chain transfer agent" are used interchangably throughout.

A. Mercapto Functional Silicone Chain Transfer Agents And Preparation Thereof The formula of the mercapto functional silicone macromolecular chain transfer agent useful in the preparation of vinyl-siloxane copolymer is set forth below.

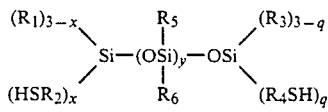

$R_1$ has been defined above as monovalent moieties which can independently be the same or different which are selected from the group consisting of alkyl, aryl, alkaryl, alkoxy, alkylamino, hydroxyl and fluoroalkyl, and hydrogen. Preferably, $R_1$ are monovalent moieties which can independently be the same or different selected from the group consisting of $C_{1-4}$ alkyl and hydroxyl for reasons of commercially availability. Most preferably, $R_1$ is selected from the group consisting of methyl and butyl.

As indicated above, $R_2$ are divalent linking groups which can independently be the same or different. Suitable divalent linking groups include but are not limited to the following: $C_1$ to $C_{10}$ alkylene, arylene, alkarylene and alkoxyalkylene. Preferably, $R_2$ is selected from the group consisting of $C_{1-3}$ alkylene and $C_7-C_{10}$ alkarylene due to ease of synthesis of the compound. Most preferably, $R_2$ is selected from the group consisting of —$CH_2$—; 1,3-propylene; and

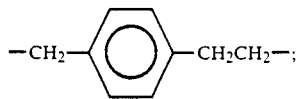

for reasons of availability.

$R_3$ has been defined above as monovalent moieties which can independently be the same or different which are selected from the group consisting of alkyl, aryl, alkaryl, alkoxy, alkylamino, hydroxyl and fluoroalkyl, and hydrogen. Preferably, $R_3$ are monovalent moieties which can independently be the same or different selected from the group consisting of $C_{1-4}$ alkyl and hydroxyl for reasons of commercial availability. Most preferably, $R_3$ is selected from the group consisting of methyl and butyl.

As indicated above, $R_4$ can independently be the same or different. Suitable divalent linking groups include but are not limited to the following: $C_1$ to $C_{10}$ alkylene, arylene, alkarylene and alkoxyalkylene. Preferably, $R_4$ is selected from the group consisting of $C_{1-3}$ alkylene and $C_7-C_{10}$ alkarylene for reasons of ease of synthesis. Most preferably, $R_4$ is selected from the group consisting of —$CH_2$—; 1,3-propylene; and

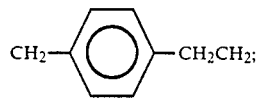

for reasons of availability.

As indicated above, $R_5$ are monovalent moieties which can be the same or different and are selected from the group consisting of alkyl, aryl, alkaryl, alkoxy, alkylamino, hydroxyl, fluoroalkyl, hydrogen, and -ZSH, wherein Z is a divalent linking group. Useful divalent linking groups Z include but are not limited to the following $C_1$ to $C_{10}$ alkylene, alkarylene, arylene, and alkoxyalkylene. Preferably, Z is selected from the group consisting of methylene and propylene for reasons of commercial availability.

When $R_5$ does not comprise a -ZSH group, $R_5$ is alkyl or fluoroalkyl, and phenyl for reasons of providing good release performance. When $R_5$ does not comprise a ZSH group, $R_5$ most preferably comprises a methyl group in order to impart to the resultant vinyl-silicone copolymer the best release performance.

As indicated above, $R_6$ are monovalent moieties which can be the same or different and are selected from the group consisting of alkyl, aryl, alkaryl, alkoxy, alkylamino, hydroxyl, fluoroalkyl, hydrogen, and -ZSH, wherein Z is a divalent linking group as defined above.

When $R_6$ does not comprise a -ZSH group, $R_6$ is preferably selected from the group consisting of $C_{1-3}$ alkyl or fluoroalkyl, and phenyl for reasons of providing good release performance. When $R_6$ does not comprise a -ZSH group, $R_6$ most preferably comprises a methyl group in order to impart to the resultant vinyl-silicone copolymer the best release performance.

The letter y has been defined as an integer of 10 or greater. Preferably, y is an integer ranging from about 40 to about 270 in order to provide the silicone segment with a molecular weight ranging from about 3,000 to about 20,000 in order to provide suitable release performance for a variety of PSAs. Most preferably, y is an integer ranging from about 67 to about 270 in order to provide the silicone segment with a molecular weight ranging from about 5,000 to about 20,000 in order to provide a mercapto functional compound having a lower ratio of mercapto functional groups to mercapto functional silicone compound.

The number of mercapto functional groups on the mercapto functional silicone compound can vary. The term "mercapto functional group", as used herein, refers to -ZSH, -$R_2$SH, and -$R_4$SH, wherein Z, $R_2$, and $R_4$ are as previously defined. The ratio of the weight of mercapto functional groups to the total weight of the mercapto functional silicone compound can range from about 0.5:99.5 to about 15:85. Preferably, the weight ratio of mercapto functional groups to mercapto functional silicone compound ranges from about 2:98 to about 10:90 in order to provide vinyl siloxane copolymers with low levels of free silicone without introducing so many mercapto functional groups that the release properties are modified. If the ratio of mercapto functional groups to mercapto functional silicone compound is too high, release properties will be detrimentally affected. If the ratio of mercapto functional groups to mercapto functional silicone compound is too low, complete formation of vinyl-silicone copolymers may not be achieved, resulting in free silicone which will contaminate the adhesive.

The mercapto-functional silicone compounds useful in the method of the present invention can be prepared by any known method including, for example, (1) cohydrolysis-condensation of a mixture consisting of an organoalkoxysilane having one or more mercapto-substituted hydrocarbon groups and an alkoxysilane possessing no mercapto groups, (2) reaction of an organoalkoxysilane having one or more mercapto-sustituted hydrocarbon groups with a cyclic organopolysiloxane or with a silanol terminated diorganopolysiloxane possessing no mercapto groups, (3) an equilibration reaction of a cyclic or linear chain organopolysiloxane having one or more mercapto-substituted hydrocarbon groups with a cyclic or linear chain organopolysiloxane having no mercapto groups, (4) reaction of an organopolysiloxane having one or more nucleophilic groups such as an aminoalkyl with an electrophilic reagent such as 3-mercaptopropionic acid, in order to yield a mercapto-derivatized organopolysiloxane, and (5) reaction of an organopolysiloxane having one or more electrophilic groups such as a haloalkyl with a nucleophilic reagent such as an alkali metal sulfide to yield a mercapto-derivatized organopolysiloxane.

U.S. Pat. Nos. 4,238,393; 4,046,795; 4,783,490 and Canadian Patent No. 1,233,290, which are discussed in the Background of the Invention, describe the preparation of mercapto-functional silicone compounds.

The methods and the compounds disclosed in the above cited patents provide useful mercapto functional silicone compounds for use in the practice of the method of the present invention and are incorporated herein by reference. The above cited references do not disclose the method of the present invention. Alternative preferred methods of preparing mercapto-functional silicone compounds, in particular those with terminal functionality, are described in detail below.

The first step in the preparation of the mercapto functional silicone macromolecular chain transfer agent is the preparation of a suitable precursor material such as an amine functional precursor material or a benzyl chloride functional precursor material.

A.I. Preparation of Diamine Functional Precursor Material Useful in Preparing Mercapto Functional Silicone Macromolecular Chain Transfer Agent.

The preparation of an organopolysiloxane diamine which can be used as a precursor in the formation of mercapto functional silicone compound macromolecular chain transfer agent is taught in Leir, European Patent Application 0 250 248 (assigned to the assignee of the present case), (publication date Dec. 23, 1987), incorporated by reference herein.

The organopolysiloxane diamine described in Leir has a molecular weight of at least 5,000 and a molecular structure represented by Formula I as follows:

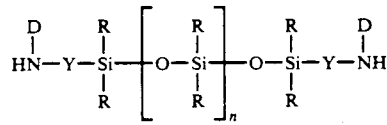

wherein
Y is an alkylene radical of 1 to 10 carbon atoms;
R is at least 50% methyl with the balance of 100% of all R radical having from 2 to 12 carbon atoms, a vinylene radical, phenyl radical, or substituted phenyl radical;
D is hydrogen, an alkyl radical of 1 to 10 carbon atoms or an alkylene radical which completes a ring structure including Y to form a heterocycle or phenyl; and
n is a number which is 50 or larger.

The method of Leir involves combining under reaction conditions and in an inert atmosphere: an amine functional endblocker of the molecular structure represented by Formula II, as follows:

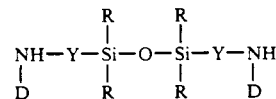

wherein D, R and Y are as defined above; sufficient cyclic siloxane to react with the amine functional end blocker to form a lower molecular weight organopolysiloxane diamine having a molecular weight less than about 2,000 and a molecular structure represented by Formula III, as follows:

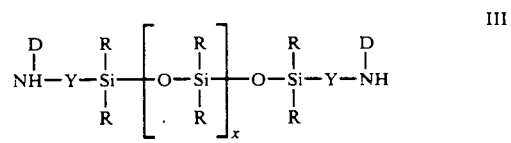

wherein D, R, and Y are as defined above and x is a number in the range of about 4 to 40; and a catalytic amount not to exceed about 0.1% by weight based on the ultimate weight of the final organopolysiloxane diamine of a novel essentially anhydrous amine silanolate catalyst of a molecular structure represented by Formula IV, as follows:

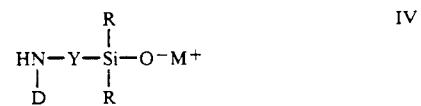

wherein D, Y and R are as defined above and M+ is a cation such as Khu +, Li+, or N(CH3)4 +. The reaction is continued until substantially all of the amine functional end blocker is consumed. This is followed by the addition of additional cyclic siloxane until the organopolysiloxane diamine represented by Formula I is obtained.

According to Leir, the preferred amine silanolate catalyst is 3-aminopropyl dimethyl tetramethylammonium silanolate. The catalYtic amount of the amine silanolate catalyst is preferably less than 0.05 weight percent, most preferably 0.005 to about 0.03 weight percent, based upon the ultimate weight of the final organopolysiloxane.

The preferred reaction conditions comprise a reaction temperature range of about 80° C. to about 90° C., a reaction time of about 5 to 7 hours, and the dropwise addition of the additional cyclic siloxane.

In the first stage of the reaction, a low molecular weight silicone diamine having a structure as defined by Formula III is prepared by reacting an amine functional disiloxane endblocker of the type represented by Formula II with a cyclic siloxane in the presence of a catalytic amount of anhydrous amine functional silanolate represented by Formula IV in an inert atmosphere such as nitrogen or argon. The amount of catalyst employed should be less than 0.05 weight percent, preferably 0.005 to about 0.03 weight percent, by weight of the resultant diamino silcone. While not wanting to be bound by theory, Leir suggested that, by using a minimum amount of an anhydrous amine functional silanolate catalyst, the number of inactive chain ends that are produced by catalyst molecules and spurious water are held to a minimum.

According to Leir, the reaction is typically carried out in bulk at a temperature of 80°–90° C., and under these conditions is usually complete in about 0.5–2 hours, as judged by substantially complete disappearance of the endblocker of the reaction mixture as determined by vapor phase chromatography. An intermediate organopolysiloxane diamine is obtained having a molecular weight of less than about 2,000 and a molecular structure represented by Formula III.

The second stage of the reaction involves the slow addition of the remainder of the cyclic siloxane required to achieve the desired molecular weight preferably by dropwise addition, at such a rate that the cyclic siloxane is incorporated into the polymer about as fast as it is added, usually in about 5 to 7 hours at the reaction temperature of 80–90° C. The desired organopolysiloxane diamine is produced having a molecular weight in excess of 5,000 and a structure as defined by Formula I. By utilizing this two-stage method with a minimum amount of amine functional anhydrous silanolate catalyst, silicone diamines of Formula I may be consistently prepared in any desired molecular weight from about 5,000 to about 70,000 having excellent difunctionality with little contamination from monofunctional and nonfunctional polysiloxane impurities.

A.II Preparation of Mercapto Functional Silicone Macromolecular Chain Transfer Agent from Amine Functional Precursor Material.

The diamine functional precurser material described above is subsequently reacted with a compound such as γ-thiobutyrolactone to yield dimercapto functional silicone compound.

The diamine functional precursor described above is charged into a suitable corrosion resistant vessel. The vessel should be equipped with a vacuum aspirator, a means of agitation such as a mechanical stirrer, and a nitrogen gas inlet. The amine precursor material is then degassed by heating to above about 90° C. and creating a vacuum with the aspirator. A slight excess of mercapto compound γ-thiobutyrolactone is added to the amino precursor followed by mixing of the two components. The resulting mixture is then heated to a temperature above about 70° C., preferably above about 90° C., for about 2 to 5 hours or until complete reaction occurs. Unreacted γ-thiobutyrolactone is stripped off at about 110° C., preferably 130° C. or above, by creating a vacuum with the water aspirator.

A.III. Preparation of Benzyl Chloride Functional Precursor Material Useful in Preparing Mercapto Functional Silicone Macromolecular Chain Transfer Agents The benzyl chloride functional material useful in preparing mercapto functional silicone compound chain transfer agents can be prepared according to the procedure set forth in copending, concurrently filed, U.S. Application Kumar, et al, Siloxane Iniferter Compounds, Block Copolymers Made Therewith, and a Method of Making The Block Copolymers, Ser. No. 07/393,550.

A.III.a. Synthesis of End Blocker

According to copending, concurrently filed, U.S. application Kumar, et al, Ser. No. 07/393,550, the first step in the preparation of the benzyl chloride functional material is the synthesis of the endblocker, which is used in the preparation of a polymerized silicone segment. The synthesis of the endblocker can be represented by the following general equation:

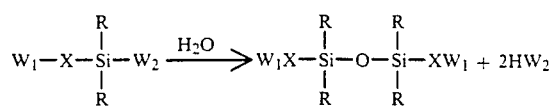

wherein $W_1$ is selected from the group consisting of Cl, Br and tosylate;

$W_2$ is selected from the group consisting of Cl, Br, and alkoxy; and

R is a monovalent moiety which can be the same or different selected from the group consisting of hydrogen, $C_{1-4}$ alkyl, $C_{1-4}$ fluoroalkyl including at least one fluorine atom, $C_{1-4}$ alkoxy and aryl.

Preferably X is a divalent species selected from the group consisting of alkylene, arylalkylene and arylene.

X can also be preferably selected from the group consisting of

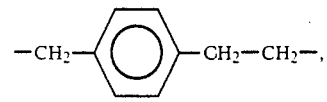

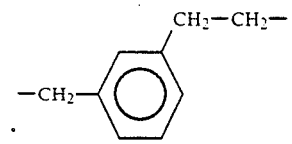

and mixtures thereof.

X can also preferably comprise a divalent radical having the general formula

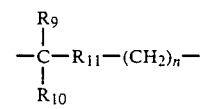

$R_9$ and $R_{10}$ can be the same or different and are selected from the group consisting of hydrogen and $C_{1-6}$ alkyl, $R_{11}$ is a divalent species selected from the group consisting of $C_{1-7}$ alkylene and phenylene; and n is an integer of at least 1.

Most preferably, X is selected from the group consisting of

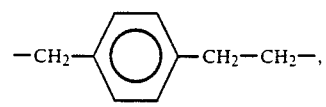

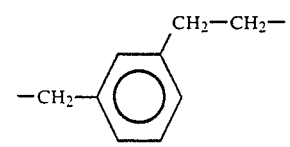

and mixtures thereof reasons of commercial availability and ease of synthesis of the siloxane iniferter compound.

The above reaction can be carried out in any suitable corrosion resistant vessel such as glass or stainless steel. The above reaction is preferably carried out at room temperature since higher temperatures may cause an exothermic reaction, resulting in the formation of a different reaction product.

A.III.b. Polymerization of Siloxane Monomers to Form Silicone Precursor to the Mercapto Functional Silicone The second step in the preparation of the benzyl functional precursor compound is the polymerization of an organocyclosiloxane monomer by use of the end blocker in order to form a "silicone precursor" also referred to as a "polymerized silicone segment" herein. The terms "silicone" and "siloxane" are also used interchangeably herein. The end blocker should be capable of controlling the molecular weight of the polymerized silicone segment. Suitable organocyclosiloxane monomers include but are not limited to the following: hexamethylcyclotrisiloxane, "$D_3$", and octamethylcyclotetrasiloxane, "$D_4$". The selection of the endblocker is important since it caps one or both ends of the polymerized silicone segment to form a monofunctional or difunctional mercapto silicone compound, respectively.

A.III.b.i. Preparation of Silicone Precursor to Monofunctional Mercapto Silicone Compound The preparation of a silicone precursor to the monofunctional mercapto silicone compound is accomplished by anionic polymerization.

Suitable monomers for use in the above-mentioned anionic polymerization are, in general, diorganocyclosiloxanes of the formula

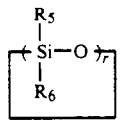

wherein $R_5$ and $R_6$ are monovalent moieties which can be same or different selected from the group consisting of hydrogen, $C_{1-4}$ alkyl, $C_{1-4}$ fluoroalkyl including at least one fluorine atom and aryl, as previously defined and wherein r is an integer of 3. The preferred monomer is the cylic siloxane wherein r is an integer of 3 and $R_5$ and $R_6$ are both methyl groups, these cyclic siloxanes being designated as hexamethylcyclotrisiloxane, "$D_3$".

Initiators of the anionic polymerization reaction are chosen such that redistribution reactions are much slower than chain growth thus monofunctional living polymer is produced. Suitable initiators include but are not limited to alkyl or aryl lithium compounds containing up to 20 carbon atoms in the alkyl or aryl radical or more, preferably up to 8 carbon atoms. Examples of such compounds include methyl lithium, ethyl lithium, n-butyl lithium, sec-butyl lithium, tert-butyl lithium, phenyl lithium, and 2-ethylhexyl lithium. Examples of additional useful initiators include but are not limited to alkali metal alkoxides, hydroxides, and amides, as well as triorganosilanolates of the formula

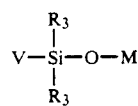

wherein

M is a lithium or benzyltrimethylammonium bis (o-phenylenedioxy)phenyl cation, the latter cation requiring a coactivator such as water or alcohol;
V is an organic moiety that is essentially unreactive under subsequent reaction conditions; and
$R_3$ is as previously defined.

Preferably, V is selected from the group consisting of alkyl, aryl, and fluoroalkyl.

The preferred triorganosilanolate initiator is lithium trimethylsilanolate (LTMS). Preferably, the reaction components comprise both strained cyclic monomer and lithium initiator, thus reducing the likelihood of redistribution reactions and thereby providing silicone precursor having a narrow molecular weight distribution which is reasonably free of unwanted cyclic oligomers and nonfunctional or difunctional polymers.

For the initiation of the anionic polymerization, an inert, preferably polar, organic solvent can be utilized. Anionic polymerization propagation with a lithium counterion requires either a strong polar solvent such as tetrahydrofuran (THF), dimethyl sulfoxide, or hexamethyl-phosphorous triamide, or a mixture of such a strong polar solvent with a nonpolar aliphatic, cycloaliphatic, or aromatic hydrocarbon solvent such as hexane, heptane, octane, cyclohexane, or toluene. The polar solvent allows the initiator to dissociate, thus "activating" the initiator and making propagation possible. If a nonpolar solvent is utilized, the initiator, such as lithium trimethylsilanolate, will not dissociate and hence will not be "activated".

Generally, the polymerization can be carried out at a temperature ranging from about $-20°$ C. to about $100°$ C., preferably from about $-10°$ C. to about $50°$ C. Anhydrous conditions and an inert atmosphere such as nitrogen, helium, or argon are required. Termination of the anionic polymerization is, in general, achieved via direct reaction of the living polymeric anion with halogen-containing terminating agents, i.e., functionalized chlorosilanes of the formula

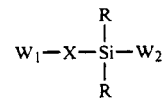

wherein $W_1$, $W_2$, X, and R are as previously defined.

A.III.b.ii. Preparation of Silicone Precursor to Dimercapto Silicone Compound The preparation of the novel silicone precursor compound involves an acid or base catalyzed equilibration reaction of diorganocyclosiloxanes having the general formula

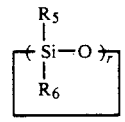

wherein $R_5$, $R_6$, and r are as previously defined, with an end blocker having the general formula

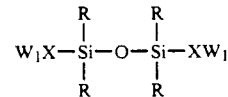

wherein $W_1$, X, and R are as previously defined.

Octamethyl cyclotetrasiloxane, "D$_4$", is especially preferred for the acid or base equilibration reaction for reasons of commercial availability. Examples of proton acids useful as catalysts include sulfuric acid, ethane sulfonic acid, selenic acid, nitric acid, phosphoric acids, pyrophosphoric acid, and boric acid. An example of a useful carboxylic acid catalyst is trifluoroacetic acid. Lewis acid catalysts useful for polymerization are iron (III) chloride, boron trifluoride, zinc chloride, tin (IV) chloride, etc. Bases useful as catalysts include alkali-metal hydroxides, alkali-metal silanolates, alkali-metal alkoxides, quaternary ammonimum hydroxides, tetramethylammonium silanolate, tetrabutylphosphonium silanolate, etc.

Generally, the polymerization can be carried out at a temperature ranging from about 25° C. to about 90° C., preferably from about 75° C. to about 90° C.

The selection of an endblocker which will cooperate with the silicone midblock segment to accomplish the desired overall performance of the copolymer is important and must be made in a way which will not diminish the effectiveness of the silicone segment. The functionality on the end blocks of the siloxane moiety should be able to react with soft nucleophiles such as sodium hydrosulfide.

A.IV. Preparation of Mercapto Functional Silicone Compound from Benzyl Chloride Functional Material The benzyl chloride monofunctional or difunctional material is reacted with an alkali metal hydrosulfide such as sodium hydrosulfide in order to form monofunctional or difunctional mercapto silicone compound, respectively.

The benzyl chloride monofunctional or difunctional material is combined with a metal hydrosulfide such as sodium hydrosulfide in a mixture of methanol and tetrahydrofuran solvents in a glass reaction vessel equipped with a stirring mechanism. The resulting heterogeneous reaction mixture is stirred from about 3 to 5 hours at room temperature. The mercapto functional siloxane is extracted in an ether layer. The ether is then evaporated off to obtain pure mercapto functional siloxane.

B. Preparation of Vinyl-Silicone Copolymers Utilizing Mercapto Functional Silicone Macromolecular Chain-Transfer Agents The method of the present invention involves the preparation of vinyl-silicone copolymers utilizing mercapto functional silicone chain transfer agents.

B.I. Types of Copolymers

As indicated previously, both vinyl-silicone block copolymers and vinyl-silicone graft copolymers can be formed according to the method of the present invention.

B.I.a. Vinyl-Silicone Block Copolymers

In order to form vinyl-silicone block copolymers, the mercapto functional group or groups of the mercapto functional silicone compound should be bonded to one or both silicon atoms located at either end of the polymerized silicone segment of the mercapto functional silicone compound. Thus, R$_5$ should not comprise a -ZSH moiety and R$_6$ should not comprise a -ZSH moiety in order to form a block copolymer utilizing the mercapto functional silicone molecular chain-transfer agent.

In order to form block copolymers having AB architecture, a mercapto silicone compound must be used in which a mercapto group or groups is bonded to only one terminal silicon atom on the silicone segment of the mercapto silicone compound. Thus, in order to form monofunctional mercapto silicone compound, either x must equal zero and q must equal at least one, or x must equal at least one and q must equal zero.

In order to form block copolymers having ABA architecture, a mercapto silicone compound must be used in which at least one mercapto group is bonded to both terminal silicon atoms of the polymerized silicone segment of the mercapto functional silicone compound. Thus, in order to form difunctional mercapto silicone compound, x must equal at least one and q must equal at least one.

In forming monofunctional or difunctional mercapto silicone compounds it is preferable that each silicon atom possessing mercapto functionality be bonded to only one mercapto functional group for simplicity of synthesis of the mercapto functional compound.

B.I.b. Vinyl-Silicone Graft Copolymers

In order to form a graft vinyl-silicone copolymer at least one mercapto functional group of the mercapto functional silicone compound must be bonded to a silicon atom within the silicone segment with the exception of the two terminal silicon atoms. Thus, at least one R$_5$ group or one R$_6$ group of the mercapto functional silicone compound must comprise -ZSH in order to form a vinyl-silicone graft copolymer, regardless of the existance of any mercapto functional groups bonded to the terminal silicon atoms.

B.II. Methods of Initiation

The homolytic decomposition of the initiator to form free radicals can be induced by heat energy (thermolysis), light energy (photolysis) or the addition of a suitable catalyst. "Initiator free" polymerization may also be induced electronically or by exposure to ionizing radiation.

The decomposition rate of the initiator during thermolysis depends on the chemical nature of the initiator, the reaction temperature, and the solvent (if any) used.

The decomposition rate of the initiator during photolysis depends mainly on the chemical nature of the initiator and the intensity and wavelength of the radiation.

Light energy can be supplied to induce the homolytic decomposition of the initiator by means of visible or ultraviolet sources including low intensity fluorescent black light lamps, medium pressure mercury arc lamps, and germicidal mercury lamps.

The selection of a preferred light energy source will depend on the chosen photoinitiator.

The decomposition of the initiator can also be accomplished by using a suitable catalyst. Catalyst induced initiator decomposition involves an electron transfer mechanism resulting in a reduction-oxidation (redox) reaction. Initiators such as peroxides and hydroperoxides are more susceptible to this kind of decomposition.

Catalysts useful in inducing the homolytic decomposition of the initiator include but are not limited to the following: amines, and metal ions used in combination with peroxide or hydroperoxide initiators, and bisulfite or mercapto compounds used in combination with persulfate initiators.

The preferred method of initiation comprises thermolysis which can be readily used in standard reactors.

Thermolysis also provides ease of control of the reaction rate and exotherm.

B.III. Initiators

Useful initiators in the polymerization method of the present invention are well known to practitioners skilled in the art and are detailed in Chapters 20 & 21 Macromolecules, Vol. 2, 2nd Ed., H. G. Elias, Plenum Press, 1984, New York, hereby incorporated by reference. Useful thermal initiators for use in the method of the present invention include, but are not limited to, the following:

azo compounds such as 2,2-azo-bis-(isobutyronitrile), dimethyl 2,2'-azo-bis-isobutyrate, azo-bis-(diphenyl methane), 4-4'-azo-bis-(4-cyanopentanoic acid);

peroxides such as benzoyl peroxide, cumyl peroxide, tert-butyl peroxide, cyclohexanone peroxide, glutaric acid peroxide, lauroyl peroxide, methyl ethyl ketone peroxide;

hydrogen peroxide, hydroperoxides such as tert butyl hydroperoxide and cumene hydroperoxide;

peracids such as peracetic acid and perbenzoic acid; potassium persulfate; and peresters such as diisopropyl percarbonate.

Certain of these initiators (in particular the peroxides, hydroperoxides, peracids, and peresters) can be induced to decompose by addition of a suitable catalyst rather than thermally. This redox method of initiation is described in Elias, Chapter 20, hereby incorporated by reference.

Useful photochemical initiators include but are not limited to benzoin ethers such as diethoxyacetophenone, oximino-ketones, acylphosphine oxides, diaryl ketones such as benzophenone and 2-isopropyl thioxanthone, benzil and quinone derivatives, and 3-ketocoumarins as described by S. P. Pappas, J. Rad. Cur., July 1987, p.6, hereby incorporated by reference.

Preferably, the initiator used comprises a thermally decomposed azo or peroxide compound for reasons of solubility and control of the reaction rate. Most preferably, the initiator used comprises 2,2'-azobis(isobutyronitrile) for reasons of cost and appropriate decomposition temperature.

B.IV. Solvents

As indicated previously, the use of a solvent is optional in the polymerization method of the present invention. Preferably, a solvent is utilized for reasons of decreasing the viscosity during the reaction to allow for efficient stirring and heat transfer.

Solvents useful in the polymerization process typically possess a dielectric constant greater than about 2.5. The requirement that the solvent possess a dielectric constant above about 2.5 is to ensure that the polymerization mixture remains homogeneous during the course of the reaction, allowing for the desired reaction between mercapto functional silicone compound, initiator and free radically polymerizable monomer to occur. Preferably, the solvent utilized possesses a dielectric constant ranging from about 4 to about 30 for in order to provide the best solvating power for the polymerization mixture.

Suitable solvents include but are not limited to esters such as ethyl acetate and butylacetate;

ketones such as methyl ethyl ketone and acetone;

alcohols such as methanol and ethanol; and mixtures of one or more of these.

Other solvent systems are useful. Aliphatic and aromatic hydrocarbons are not useful by themselves as solvents, since they lead to the precipitation of the vinyl polymeric segment from solution, resulting in a non-aqueous dispersion polymerization. Such hydrocarbon solvents may be useful when admixed with other more polar solvents provided that the net dielectric constant of the mixture is greater than about 2.5.

The solvent, if utilized in the free radical polymerization, may be any substance which is liquid in a temperature range of about $-10°$ C. to about $50°$ C., has a dielectric constant above about 2.5, does not interfere with the energy source or catalyst used to dissociate the initiator to form free radicals, is inert to the reactants and product, and will not otherwise adversely affect the reaction. The amount of solvent, if used, is generally about 30 to 80 percent by weight based on the total weight of the reactants and solvent. Preferably, the amount of solvent utilized ranges from about 40 to about 65 percent by weight based upon the total weight of the reactants and solvent for reasons of yielding fast reaction times and high molecular weight at appropriate product viscosities.

In addition to solution polymerization herein described, the copolymerization may be carried out by other well known techniques such as suspension, emulsion and bulk polymerization. Solution polymerization which is described above is preferred due to the ease of coreaction of the mercapto functional silicone compound, initiator, and vinyl monomer.

If the polymerization is conducted in the absence of a solvent, the free radically polymerizable vinyl monomer used must have a dielectric constant above about 2.5 in order to ensure that the polymerization mixture remains homogeneous during the course of the reaction, allowing for the desired reaction between the mercapto functional silicone compound, initiator and monomer.

Thus, the reaction mixture may include a suitable inert solvent having a dielectric constant above about 2.5, but this is not necessary since some of the monomeric materials are liquid themselves and if the monomeric material possess a dielectric constant above about 2.5 they may thus be charged into the reaction vessel without utilization of a solvent.

It is possible that the solvent or free radically polymerizable monomer can possess individual dielectric constants of less than about 2.5, as long as the combination of the monomer and solvent possesses a "net" dielectric constant greater than about 2.5. Thus, the monomer can have a dielectric constant less than about 2.5 as long as the net dielectric constant of the free radically polymerizable monomer and solvent is greater than about 2.5. Likewise, the solvent, if utilized, can have a dielectric constant less than about 2.5 as long as the net dielectric constant of the free radically polymerizable monomer and solvent is greater than about 2.5.

B.V. Monomeric Components

Representative examples of such monomers include styrene, vinyl acetate, vinyl chloride, vinylidene chloride, N-vinyl pyrrolidone, acrylonitrile, acrylic acid, methacrylic acid, itaconic acid, acryamide, methacrylamide, N,N-dimethylacrylamide, methacrylonitrile, and maleic anhydride, and acrylic or methacrylic acid esters of nontertiary alcohols such as methanol, ethanol, propanol, isopropanol, butanol, isobutanol, cyclohexanol, benzyl alcohol, dodecanol, isoborneol, hexadecanol, and octadecanol, the alcohols having from 1 to 18 carbon atoms. Such monomers are known in the art, and many are commercially available.

The preferred copolymers are those wherein the free radically polymerizable monomer is selected from the group consisting of styrene, methyl methacrylate, methyl acrylate, acrylic acid, acrylonitrile, isobornyl methacrylate, N-vinyl pyrrolidone, butyl methacrylate, isopropyl methacrylate, and mixtures thereof.

The weight ratio of vinyl polymer block or segment, A, to silicone segment of the copolymer can vary. The preferred copolymers are those wherein the weight ratio of vinyl polymer segment to silicone segment ranges from about 98:2 to 40:60, in order that the copolymer possess properties inherent to each of the different polymeric segments.

A can be defined as a block (in the case of block copolymers), or a pendant chain segment (in the case of graft copolymers) formed from polymerized free radically polymerizable monomer.

A can comprise a homopolymer segment or block, or a copolymer segment or block. The selection of the composition of A is typically based upon the intended uses of the copolymer and the properties the copolymer must possess in order to accomplish its intended purpose. If A comprises a block in the case of block copolymers, a polymer having AB and ABA architecture will be obtained depending upon whether a mercapto functional group -SH is attached to one or both terminal silicon atoms of the mercapto functional silicone compound, respectively.

The method of polymerization described herein can yield small amounts of homopolymers from vinyl monomers. The presence of these homopolymers does not significantly affect the performance of vinyl-silicone copolymers in most applications.

B.VI. Method of Polymerization

The free radically polymerizable monomer charge, the initiator, the mercapto functional silicone compound and any solvent employed are charged into an appropriate vessel. If photolysis is conducted to decompose the initiator, the reactants and any solvent employed are charged into an energy source-transparent vessel and therein subjected to the energy source. If the energy source is ultraviolet light radiation, a suitable ultraviolet light-transparent vessel is utilized.

If thermolysis is used to decompose the initiator, the reactants and any solvent employed are charged into a suitable glass or metal reactor and therein subjected to the thermal energy source. If catalysis is used to decompose the initiator, a glass or metal reactor can also be utilized.

The reaction is preferably conducted in a vessel with agitation to permit uniform exposure of the reactants to the energy source. While most of the reactions have been conducted by employing a batch process, it is possible to utilize the same technology in a continuous polymerization operation.

Reaction times on the order of 10 to 40 hours have been found to be typical, depending upon the amount and type of solvent used, the amount and type of initiator used, temperatures or photolytic energy supplied, and the nature of the free radically polymerizable monomer.

The block copolymers and graft copolymers formed according to the method of the present invention may, when necessary or desirable, be blended with a compatible modifier in order to optimize physical properties. The use of such modifiers is common in the art. For example, it may be desirable to include such materials as pigments, fillers, stabilizers, or various polymeric additives.

The vinyl-silicone copolymers which can be made in the practice of the present invention can be recovered by standard procedures such as precipitation after polymerization into a suitable organic solvent such as methanol, hexane, etc. Standard extraction techniques also can be used if desired. These vinyl-silicone copolymers can be used in a variety of applications such as thermoplastics, mold release agents, and permselective membranes.

B.VII. Vinyl-Silicone Copolymers Useful as Release Coatings

Block copolymers and graft copolymers prepared according to the method of the present invention can find use as release coatings.

In order to form a copolymer useful as a release coating, y should comprise an integer of 10 or greater in order to provide a distinct silicone phase to the copolymer. Preferably, however, y is an integer ranging from about 40 to about 220 in order to provide a copolymer having release characteristics with a broad range of capabilities.

The preferred weight ratio of vinyl polymeric segment or block, A, comprising polymerized free radically polymerized monomer, to silicone polymeric segment of the copolymer ranges from about 98:2 to 40:60, in order to allow for a wide range of release performance while still maintaining good film forming properties.

Useful copolymers include but are not limited to those wherein the free radically polymerizable monomer or monomers are chosen such that a backbone $T_g$ or $T_m$ above about $-20°$ C., to provide a tack-free material, is obtained upon polymerization.

The preferred copolymers for use as release coatings are those wherein the free radically polymerizable monomer is selected from the group consisting of styrene, methyl methacrylate, methyl acrylate, acrylic acid, acrylonitrile, isobornyl methacrylate, N-vinyl pyrrolidone, butyl methacrylate, isopropyl methacrylate, vinyl acetate, hydroxy propylacrylate, hydroxy ethyl acrylate and mixtures thereof.

Most preferably, A comprises a copolymer block consisting essentially of methyl acrylate and acrylic acid.

A, which is defined above, can comprise a homopolymer block or segment or a copolymer block or segment. Preferably, A comprises a copolymer block or segment for reasons of imparting better adhesion, water dispersability, and ink receptivity.

The selection of the composition of A is typically based upon the intended use of the release coating and the properties the release coating must possess in order to accomplish its intended purpose. In the case of block copolymers, if A comprises a block, the polymer will have AB or ABA architecture depending upon whether a monofunctional mercapto silicone compound or difunctional mercapto silicone compound is used, respectively, in forming the block copolymer.

The release coatings may comprise the defined copolymer alone, or may comprise such copolymers blended with a compatible homopolymer, copolymer, etc. The low percentage of silicone block contained in the copolymers makes the copolymers readily compatible with polymers of similar composition to the vinyl polymeric blocks or segments. In addition, there are several pairs of dissimilar polymers that yield compatible blends due to specific interaction as described by S. Krause in *Polymer Blends,* Academic Press, New York, 1978. Introduction of a low level of silicone block onto one of these polymers will not influence compatibility.

Fillers or pigments (e.g., alumina, silica, titania, or calcium carbonate) may, of course, be added to the copolymer compositions to reduce gloss and also impart a surface texture that is more receptive to marking with pencils and roller ball pens.

The preferred method of preparation of the release compositions of this invention provides copolymers of high purity which can be coated directly from the polymerization solvent. The resultant coatings do not require curing or crosslinking. However, if solvent resistance is desired for a particular application, crosslinking can be effected by standard methods wellknown in the art, such as radiation curing (electron beam or ultraviolet light) or chemical crosslinking. Since silicone constitutes only a portion of the coating (even at easy levels of release suitable for release liner applications), these copolymer compositions provide a potential cost savings over conventional 100% silicone release compositions and numerous blends.

The release copolymers defined above are best used as a coating for a solid substrate, which may be a sheet, fiber, or shaped object. However, the preferred substrates are flexible substates used for pressure-sensitive adhesive products. Suitable substrates include paper, metal sheets and foils, non-woven fabrics, and films of thermoplastic resins such as polyesters, polyamides, polyolefins, polycarbonates, polyvinyl chloride, etc., although any surface requiring release toward adhesives can be used. Primers known in the art can be utilized to aid in adhesion of the coating to the substrate, but they are not generally necessary.

The release coating compositions may be applied to suitable substrates by means of conventional coating techniques such as wire-wound rod, direct gravure, offset gravure, reverse roll, air-knife, and trailing blade coating; hot melt coating is also possible. The resultant coatings provide effective release for a wide variety of conventional pressure-sensitive adhesives such as natural rubber-based, acrylic, and other synthetic film-forming elastomeric materials.

The present invention provides a roll of tape which includes a flexible backing member, a pressure-sensitive adhesive coating one major surface of the backing member, and a release coating on the opposite major surface of the backing comprising the polymer defined above. The invention further provides a tape comprising a flexible backing member, a pressure-sensitive adhesive coating one major surface of the tacking member and a release liner comprising a flexible sheet coated over the major surface adhered to the pressure-sensitive coating with the copolymer defined above. The invention further provides a transfer tape comprising a film of pressure-sensitive adhesive between two release liners, at least one being coated with the copolymer.

The invention also provides a coated sheet material wherein the release agent is on one side of the sheet and the adhesive is on the other side. The invention further provides a coated sheet material wherein the adhesive is a normally tacky and pressure-sensitive adhesive. The invention also provides a stack of superimposed sheets of the coated sheet material, the pressure-sensitive adhesive on each sheet being in contact with the release agent on an immediately adjacent sheet.

The invention also provides a fanfolded web formed from the coated sheet material, the adhesive on each segment of the web being in contact with the release agent on an immediately adjacent segment. The invention also provides the coated sheet material wherein the adhesive is present in a band adjacent one edge of the sheet. The invention also provides a stack of individual sheets formed from the coated sheet material, the adhesive bands of adjacent sheets lying along opposite edges. The invention further provides a coated sheet material having a release agent on one side and an adhesive on the other side wherein said coated sheet material can be wound convolutely on itself about a core to form a roll. The invention further provides the coated sheet material wherein the adhesive is a normally tacky pressure-sensitive adhesive.

The invention further provides a coated sheet material wherein the release agent covers a first portion of one side and a normal tacky and pressure-sensitive adhesive covers a second portion of the same side. The invention further provides a coated sheet material wherein the sheet is an elongate strip having spaced alternating areas of release agent and an adhesive. The invention also further provides the coated sheet material wherein the sheet is generally rectangular, the release agent being present in a band adjacent one edge and the pressure-sensitive adhesive being present in a band adjacent the opposite edge.

The copolymers comprising the release coating have a well-defined structure. When such copolymers are coated on a substrate, the silicone segment is thought to present a low energy, "siliconized" release surface, and the higher energy vinyl polymeric blocks or segments are thought to provide adhesion to the base material. The chemical nature or composition of the vinyl polymeric blocks or segments can be modified independent of the release aspect, to improve adhesion to the substrate, to allow for water dispersability, to impart ink receptivity, etc. without any serious perturbation of the surface characteristics of the film. The release properties of the coating are determined by both the silicone content (weight percentage) of the copolymer and the molecular weight of the silicone segment, with higher silicone content and/or molecular weight providing easier release. A copolymer or copolymer blend can, therefore, be chemically tailored to provide a specific level of release which can be reproduced with consistency, thus making possible the variation of the release properties of a backing over a range of values in a controlled fashion. Thus, by virtue of their chemical composition and structure and the resultant properties, the copolymers are uniquely well-suited to controlled release coating applications.

The silicone polymeric segment must have a number average molecular weight above about 1000 in order for the release coating to function properly. Preferably, the silicone polymeric segment has a number average molecular weight of about 1000 to about 20,000. Most preferably, the silicone polymeric segment has a number average molecular weight ranging from about 2,000 to about 15,000. The silicone polymeric segment can comprise about 2 to 60 wt% of the copolymer in order to allow for a wide range of release performance while still maintaining good film forming capabilities.

The requirement that the polymerized free radically polymerizable monomer segment or segments possess a Tg or Tm above about −20° C. is in order to insure that the coating is non-tacky.

The composition of the copolymer is such as to provide the copolymer with a surface release value not greater than about 50 N/dm. It should be understood that this upper limit of 50 N/dm applies to use with highly aggressive pressure-sensitive adhesives (PSAs) which have peel adhesion values of 100 N/dm or higher. PSAs as a group fall into three broad categories (1) low (5–15 N/dm), (2) intermediate (25–50 N/dm), and (3) high (60–100 plus N/dm) peel adhesion ranges. It is apparent that the degree of release can be selected to match the aggressiveness of the PSA with which it will be in contact and it is only for the most aggressive PSAs that a release value as high as 50 N/dm would be selected. Release coatings for less aggressive PSAs would be selected to be correspondingly lower.

Thus, an aspect of the invention relates to a coated sheet material comprising a flexible sheet and a vinyl-silicone copolymer release coating covering at least a portion of one major surface of the flexible sheet, wherein the release level for a given pressure sensitive adhesive can be systematically changed from a tight low adhesion backsize level (15 to 30 N/dm) to a premium release liner level (0.2 to 0.6 N/dm) by variation in the amount and type of silicone present. This, coupled with utility for a variety of pressure sensitive adhesive types, allows for the use of this invention in satisfying a wide range of application needs.

Waterborne Release Coatings

Certain of the release coatings prepared according to the method of the invention can be coated as waterborne materials, eliminating the environmental concerns, flammability, and costs usually associated with solvent-borne coatings of low adhesion backsizes and release materials. Waterborne release coatings can be prepared by following the method set forth in copending concurrently filed U.S. patent application General Purpose Siloxane Release Coatings, Kumar, et al., Ser. No. 07/393,557, hereby incorporated by reference.

Vinyl-siloxane copolymers suitable for waterborne application are either those containing ionic functionalities in the vinyl polymeric block or segment or those containing acidic or basic functionalities which on neutralization yield ionic functionality.

Certain of the vinyl-siloxane copolymers comprising the release coatings of the coated substrates of the present invention can be modified to obtain a water dispersable formulation by a neutralization technique, specifically those copolymers containing acidic or basic functionality in the vinyl block or segment.

Copolymers containing acidic functionality are obtained by copolymerizing acidic monomers into the vinyl block or segment. Suitable acidic monomers include those containing carboxylic acid functionality such as acrylic acid, methacrylic acid, itaconic acid, etc.; those containing sulfonic acid functionality such as 2-sulfoethyl methacrylate; and those containing phosphonic acid functionality.

Copolymers containing basic functionality are obtained by copolymerizing basic monomers into the vinyl block or segment. Suitable basic monomers include those containing amine functionality such as vinyl pyridine, N,N-diethylaminoethyl methacrylate, N,N-dimethylaminoethyl methacrylate, N,N-dimethylaminoethyl acrylate, and N-t-butylaminoethyl methacrylate.

Preferred acidic monomers include acrylic acid and methacrylic acid. Preferred basic monomers include N,N-dimethylaminoethyl methacrylate and N,N-dimethylaminoethyl acrylate.

In order to achieve water compatibility or dispersibility, a certain minimum ionic content in the copolymer is required. The exact amount varies with the particular polymer formulation, the molecular weight of the polymerized siloxane segment, and other features of the individual copolymer. However, the addition of ionic groups, while increasing water miscibility, can negatively affect polymer properties, in particular the stability of the release performance under conditions of high humidity. It is therefore preferred that the ionic content either be kept to the minimum amount required to yield stable aqueous dispersions while maintaining other desirable properties, or that the ionic content introduced to achieve water dispersibility be non-permanent in nature. As described below, this non-permanence is achieved by using a volatile weak acid or base in the neutralization technique which allows the polymer to revert to its original state on coating and drying. The introduction of such non-permanent ionic groups is most preferred. Generally a minimum of about 2% by weight of ionic content will yield a stable dispersion, considering the weight of the ionic group to include only the simplest of constructions, e.g., the monomer from which the ionic group is derived plus the base or acid used to neutralize it, as the molecular weight of the ion. Preferred copolymers incorporate above about 4% ionic content. Copolymers with permanent ionic content of over about 15% are too hydrophilic for use in most applications.

Preferably the copolymer is prepared in a water-miscible solvent which has a boiling point below 100° C. such as acetone or methyl ethyl ketone. Alternatively, a non-water-miscible polymerization solvent such as ethyl acetate may be utilized. The non-water-miscible polymerization solvent may be removed from the copolymer by using a rotary evaporator. The resulting copolymer can then be dissolved in a water-miscible solvent such as those described above or mixtures including isopropanol, methanol, ethanol, tetrahydrofuran, etc.

The resulting solutions are added to an aqueous solution of a base, in the case of the acidic functional blocks or segments, or an acid, in the case of the basic functional blocks or segments. Suitable bases include ammonia and organic amines, such as triethyl amine, triethanol amine, methyl amine, morpholine, etc.; as well as metal hydroxides, oxides, carbonates, etc. Suitable acids include carboxylic acids such as acetic acid, as well as mineral acids, such as HCl. In the case of a volatile weak base (e.g., ammonia) or acid (e.g., acetic acid) the ionic group formed (an ammonium carboxylate) is non-permanent in nature. For example, for an acrylic acid containing polymer neutralized with aqueous ammonia, the polymer remains as the ammonium acrylate derivative when dispersed in water, but is thought to revert to its original free acid state as the coating dries on the surface. This is because there is an equilibrium between the neturalized and free acid which is shifted towards the free acid as the ammonia is driven off on drying. This accounts for the similar performance observed for polymers coated as either solventborne or waterborne neutralized solutions. Acid or base in excess of an equivalent is preferably used to insure complete neutralization of the polymer and hence provide the best water dispersability, although this is not necessary in the majority of the cases.

For coating purposes, the polymer is diluted with water to less than about 10% solids. Agitation is sometimes necessary to yield a well dispersed polymer solution. The resulting dispersion may be used as prepared, or may be stripped of organic solvent by elevating temperature and/or reducing pressure. The removal of organic solvent is desirable when flammability or emissions are a concern. It is also beneficial in certain cases to add an organic solvent with a boiling point above about 100° C., such as 2-(2-butoxyethoxy)ethanol, 2-(2-hexoxyethoxy)ethanol, 2-(2-butoxyethoxy)ethyl acetate, furfuryl alcohol, N-methyl pyrrolidone, etc., in an amount up to about twice the amount of the copolymer present. This results in improved release performance in some cases relative to the aqueous solution coated without this high boiling solvent. In addition, the presence of this additive may reduce foaming problems during stripping of the low boiling organic solvent from these dispersions.

Ink Receptive Release Coatings

Certain of the release coatings of the coated sheet materials of the present invention are receptive to water and oil based pen inks.

Release coatings for pressure sensitive labels and tapes typically obtain their adhesive qualities from long chain hydrocarbon components, silicone components, or fluorocarbon components. These low surface energy coatings thus tend to be hydrophobic, so although they are receptive to oil based pen inks, they cause dewetting of water based pen inks. This has made their use marginally acceptable in office and labeling applications, where there is typically a need to write on the release coated side of a label or tape.

In the label area, the larger substrate area involved necessitates near-premium release properties for a release coating. The lack of acceptable ink-receptive release coatings has lead to constructions involving a release liner which is stripped and discarded in use. A more economical and aesthetically pleasing embodiment would involve stacks or pads of adhesive coated sheets wherein the adhesive on the back of one sheet is in contact with the ink-receptive release coating on the face of the next sheet.

Mertens, et al copending U.S. application Ser. No. 07/278,283, filed Nov. 20, 1988, (assigned to the assignee of the present case) hereby incorporated by reference, has described a free-radically prepared release coating which overcomes the need to use a release liner. Mertens, which does not teach or suggest the method of the present invention, discusses the nature of the vinyl polymeric segment required to impart ink receptivity to a release agent having at least one vinyl polymeric segment and at least one siloxane segment. According to Mertens the vinyl polymeric segment should have a hydrated $T_g$ between −15° C. and +35° C., the should be at least 20° C., and a coating of the release agent should have a receding contact angle with water of less than 25°. The application of these ranges set forth in Mertens to the vinyl-siloxane copolymer release coating described herein results in release coatings that are receptive to water and oil based pen inks.

EXAMPLES

The following detailed description includes the exemplary preparation of vinyl-silicone copolymers in accordance with the invention. The detailed description also includes the exemplary preparation of flexible substrates coated with the copolymers and evaluation of immediate release properties and aged release properties of the coated substrates. All parts and percentages in the examples are by weight unless otherwise specified.

TABLE I

| Abbreviation | Abbreviations |
|---|---|
| | Monomer |
| MA | methyl acrylate |
| AA | acrylic acid |
| NVP | N-vinyl pyrrolidone |
| DEAEMA | N,N-diethylamino methacrylate |
| BMA | butyl methacrylate |
| MAA | methylacrylic acid |
| MMA | methyl methacrylate |
| | Tape |
| A | an aggressive acrylic pressure sensitive adhesive coated on a cellulose acetate backing |
| B | a rubber-resin pressure sensitive adhesive coated on a creped paper backing |
| C | a removable acrylic adhesive coated on a cellulose acetate backing |

TEST METHODS

The test method used to evaluate the release coated flexible sheet materials of the Examples is a modification of the industry standard peel adhesion test used to evaluate PSA coated materials. The standard test is described in detail in various publications of the American Society for Testing and Materials (ASTM), Philadelphia, Pa., and the Pressure Sensitive Tape Council (PSTC), Glenview, Ill. The modified standard method is described in detail below. The reference source of the standard test method is ASTM D3330-78 PSTC-1 (11/75).

Immediate Release Value

This test measures the effectiveness of the LAB as a release agent. The immediate release value is a quantitative measure of the force required to remove a flexible adhesive tape from a substrate coated with the test composition at a specific angle and rate of removal. In the following examples this force is expressed in Newtons per decimeter (N/dm). A portion of each polymer solution prepared below in Examples 1 to 34 was diluted to 10% solids with an appropriate organic solvent. The solution was then coated with a #6 wire wound (Mayer) rod onto a 1.6 mil polyester terephthalate film, dried 5 minutes at 65° C., and conditioned overnight at constant temperature (22° C.) and humidity (50% RH).

Immediate release testing was conducted by laminating a 2.54 cm by 20.32 cm strip of the coated polyester film coated side up to the stage of an Instromentors, Inc. slip/peel tester (model 3M90) with double coated tape. A 1.9 cm by 15.24 cm strip of a PSA coated test tape (indicated in Table II) was rolled down onto the laminate thus formed with a 1.82 kg rubber roller. The force required to remove this tape at 180° and 228.6 cm/minute was then measured. The results of these tests are reported in Table II.

Aged Release Value

Aged release testing was conducted in a similar manner to immediate release testing, with the exception of allowing the test tape to dwell in contact with the coated polyester film for two days at either room temperature or 65° C., prior to removal. For these aged test tapes, readhesions were also measured by adhering the freshly peeled tape to a clean glass plate and measuring the peel adhesion in normal fashion using the same Instrumentors slip/peel tester indicated above, again peeling at 228.6 cm/min and at a 180° peel angle. The value obtained was divided by the peel value for the same tape obtained directly from the roll and multiplied by 100 to provide a measurement in percent of the retained adhesion. These measurements were taken to determine whether a drop in the adhesion value occurred due to undesirable contamination of the adhesive surface by the release coating. The results of these tests are reported in Table II.

Ink Receptivity Testing

Ink receptivity of the polymers formed according to Examples 1 to 37 was assessed by drawing on the coated sheets described above with test pens containing water based inks. The test pens used included a blue 3M Nonpermanent Transparency Marking Pen #00-0015-1012-2, a black Paper Mate ® Nylon Fiber Point 862-11, and a red Sanford EXPRESSO ® Extra Fine Point #39002. The amount of dewetting (i.e. discontinuities) observed for lines drawn by these pens was used to characterize ink receptivity, with an excellent classification given for no dewetting, good for slight dewetting, fair for moderate ($<50\%$) dewetting, poor for substantial dewetting but still readable, and very poor for complete dewetting. Results of the ink receptivity test for Examples 1 to 37 are reported in Table II.

The mercapto functional silicone compounds used in Examples 1-30 are pendant functional, mercaptopolydiorganosiloxanes of 100-200 centistokes viscosity obtained commercially from Huls America, Inc. The mercaptopolydiorganosiloxanes used are copolymers comprising dimethyl siloxane copolymerized with either 1-3 mole% 3-mercaptopropylmethyl siloxane units (catalog # PS 849) or 5-10 mole% 3-mercaptopropyl methyl siloxane units (catalog # PS 850). A $^{13}$C NMR analysis at 68 MHz using an IBM-Bruker NR270 instrument run in a "without NOE". ("NOE" stands for nuclear Overhauser effect) mode to yield a quantitative spectrum which demonstrated that the average structure of these materials was:

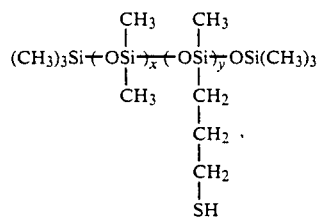

wherein
PS 849: $x=90$, $y=1.5$, $\overline{M}n=7015$,
PS 850: $x=103$, $y=5$, $\overline{M}n=8450$.

Examples A and B describe mercapto functional silicone macromolecular agents prepared from amine functional precursor material and benzyl chloride functional material, respectively. The mercapto functional compound prepared according to Example A is used in the method of Examples 35-37. The mercapto functional compound prepared according to Example B is used in the method of Example 31-34.

EXAMPLE A

Preparation of Mercapto Functional Silicone Macromolecular Chain Transfer Agent from Amine Functional Precursor Material Into a 250 ml 3-neck flask equipped with a vacuum aspirator, mechanical stirrer and nitrogen inlet was charged 55 grams of 5000 molecular weight diamine siloxane.

The diamine siloxane was degassed by heating at 90° C. and by creating a vacuum with the aspirator. Next, 2.5 grams of γ-thiobutyrolactone was added to the diamine siloxane and the resultant mixture was heated to 90° C. for about 2.5 hours. Unreacted γ-thiobutyrolactone was stripped off at 150° C. by creating a vacuum with the water aspirator. The reaction yielded 45 grams of mercapto functional silicone macromolecular chain transfer agent.

EXAMPLE B

Preparation of Mercapto Functional Silicone Compound from Benzyl Chloride Functional Material Into a 500 ml 2-neck flask equipped with a mechanical stirrer was charged 39 grams of difunctional siloxane followed by two grams of sodium hydrosulfide which was previously dissolved in 58.0 grams of methanol and 40.3 grams of tetrahydrofuran (THF) in order to form a heterogeneous reaction mixture. The heterogeneous reaction mixture was slurried for five hours at room temperature. Dimercapto siloxane was extracted in an ether layer using an ether and water mixture. The ether layer was stored over MgSO$_4$ for two hours to completely dry the material. The ether was evaporated off to obtain 35 grams of pure dimercapto functional silicone compound.

EXAMPLE 1

Into a 4 ounce reaction bottle was charged 3 grams of PS-849 pendant functional mercaptopolydiorganosiloxane of 100-200 centistokes viscosity (available from Huls America Inc.), 12 grams of methyl acrylate, 6 grams of acrylic acid, 30 grams of methylethyl ketone, and 0.06 grams 2,2'-azobisisobutyronitrile (AIBN). The head space was flushed with nitrogen for 2 minutes at 1 L/.min, after which the bottle was sealed. The sealed bottle containing the hazy solution was tumbled in a constant temperature bath for 16 hr at 55° C. resulting in a viscous cloudy white solution. Immediate release testing results and aged release testing results are reported in Table II, Example 1.

EXAMPLES 2-26

The graft copolymers of Examples 2-26 were prepared according to the procedure of Example 1. The formulation of each graft copolymer and the immediate release and aged release test results for substrates coated with the copolymers are reported in Table II, Example 2-26.

EXAMPLE 2

The procedure of Example 1 was repeated. The charges of components were as follows: MA (12 grams), AA (6 grams), PS 849 (6 grams), methylethyl ketone (30 grams), AIBN (0.06 grams).

The solution was tumbled in a constant temperature bath for 16 hours at 55° C.

EXAMPLE 3

The procedure of Example 1 was repeated. The charges of components were as follows: MA (12 grams), AA (6 grams), PS 850 (3 grams), methylethyl ketone (30 grams), AIBN (0.06 grams).

The solution was tumbled in a constant temperature bath for 16 hours at 55° C.

EXAMPLE 4

The procedure of Example 1 was repeated. The charges of components were as follows: MA (12 grams), AA (6 grams), PS 850 (6 grams), methylethyl ketone (30 grams), AIBN (0.06 grams).

The solution was tumbled in a constant temperature bath for 16 hours at 55° C.

EXAMPLE 5

The procedure of Example 1 was repeated. The charges of components were as follows: MA (9 grams), NVP (7 grams), AA (1 gram), PS 849 (6 grams), methylethyl ketone (30 grams), AIBN (0.06 grams).

The solution was tumbled in a constant temperature bath for 16 hours at 55° C.

EXAMPLE 6

The procedure of Example 1 was repeated. The charges of components were as follows: MA (9 grams), NVP (7 grams), AA (1 gram), PS 849 (6 grams), methylethyl ketone (30 grams), AIBN (0.06 grams).

The solution was tumbled in a constant temperature bath for 16 hours at 55° C.

EXAMPLE 7

The procedure of Example 1 was repeated. The charges of components were as follows: MA (9 grams), NVP (7 grams), AA (1 gram), PS 850 (3 grams), methylethyl ketone (30 grams), AIBN (0.06 grams).

The solution was tumbled in a constant temperature bath for 16 hours at 55° C.

EXAMPLE 8

The procedure of Example 1 was repeated. The charges of components were as follows: MA (9 grams), NVP (7 grams), AA (1 gram), PS 850 (6 grams), methylethyl ketone (30 grams), AIBN (0.06 grams).

The solution was tumbled in a constant temperature bath for 16 hours at 55° C.

EXAMPLE 9

The procedure of Example 1 was repeated. The charges of components were as follows: MA (12 grams), AA (6 grams), PS 850 (1 gram), methylethyl ketone (30 grams), AIBN (0.06 grams).

The solution was tumbled in a constant temperature bath for 16 hours at 55° C.

EXAMPLE 10

The procedure of Example 1 was repeated. THe charges of components were as follows: MA (12grams(, AA (6 grams), PS 850 (2 grams), methylethyl ketone (30 grams), AIBN (0.06 grams).

The solution was tumbled in a constant temperature bath for 16 hours at 55° C.

EXAMPLE 11

The procedure of Example 1 was repeated. The charges of components were as follows: MA (12 grams), AA (6 grams, PS 850 (3 grams), methylethyl ketone (30 grams), AIBN (0.06 grams).

The solution was tumbled in a constant temperature bath for 16 hours at 55° C.

EXAMPLE 12

The procedure of Example 1 was repeated. The charges of components were as follows: MA (12 grams), AA (6 grams), PS 850 (4 grams), methylethyl ketone (b 30 grams), AIBN (0.06 grams).

The solution was tumbled in a constant temperature bath for 16 hours at 55° C.

EXAMPLE 13

The procedure of Example 1 was repeated. The charges of components were as follows: MA (10 grams), AA (7.5 grams), PS 850 (1 gram), methylethyl ketone (30 grams), AIBN (0.06 grams).

The solution was tumbled in a constant temperature bath for 16 hours at 55° C.

EXAMPLE 14

The procedure of Example 1 was repeated. The charges of components were as follows: MA (10 grams), AA (7.5 grams), PS 850 (3 grams), methylethyl ketone (30 grams), AIBN (0.06 grams).

The solution was tumbled in a constant temperature bath for 16 hours at 55° C.

EXAMPLE 15

The procedure of Example 1 was repeated. The charges of components were as follows: MA (9 grams), AA (9 grams), PS 850 (1 gram), methylethyl ketone (30 grams), AIBN (0.06 grams).

The solution was tumbled in a constant temperature bath for 16 hours at 55° C.

EXAMPLE 16

The procedure of Example 1 was repeated. The charges of components were as follows: MA (9 grams), AA (9 grams), PS 850 (3 grams), methylethyl ketone (30 grams), AIBN (0.06 grams).

The solution was tumbled in a constant temperature bath for 16 hours at 55° C.

EXAMPLE 17

The procedure of Example 1 was repeated. The charges of components were as follows: MA (18 grams), AA (2 grams), PS 850 (2 grams), methylethyl ketone (30 grams), AIBN (0.06 grams).

The solution was tumbled in a constant temperature bath for 16 hours at 55° C.

EXAMPLE 18

The procedure of Example 1 was repeated. The charges of components were as follows: MA (18 grams), DEAEMA (2 grams), PS 850 (2 grams), methylethyl ketone (30 grams), AIBN (0.06 grams).

The solution was tumbled in a constant temperature bath for 16 hours at 55° C.

EXAMPLE 19

The procedure of Example 1 was repeated. The charges of components were as follows: BMA (18 grams), MAA (2 grams), PS 850 (2 grams), methylethyl ketone (30 grams), AIBN (0.06 grams).

The solution was tumbled in a constant temperature bath for 40 hours at 55° C.

EXAMPLE 20

The procedure of Example 1 was repeated. The charges of components were as follows: DEAEMA (2 grams), BMA (18 grams), PS 850 (2 grams), methylethyl ketone (18 grams), AIBN (0.06 grams).

The solution was tumbled in a constant temperature bath for 40 hours at 55° C.

EXAMPLE 21

The procedure of Example 1 was repeated. The charges of components were as follows: MMA (18 grams), MAA (2 grams), PS 850 (2 grams), methylethyl ketone (30 grams), AIBN (0.06 grams).

The solution was tumbled in a constant temperature bath for 40 hours at 55° C.

EXAMPLE 22

The procedure of Example 1 was repeated. The charges of components were as follows: MMA (18 grams), DEAEMA (2 grams), PS 850 (2 grams), methylethyl ketone (30 grams), AIBN (0.06 grams).

The solution was tumbled in a constant temperature bath for 40 hours at 55° C.

EXAMPLE 23

The procedure of Example 1 was repeated except the scale was increased ten fold and the reaction was conducted in a narrow mouthed quart bottle. The charges of components were as follows: MA (120 grams), AA (60 grams), PS 850 (20 grams), methylethyl ketone (300 grams), AIBN (0.5 grams).

The solution was tumbled in a constant temperature bath for 16 hours at 55° C.

EXAMPLE 24

The procedure of Example 23 was repeated. The charges of components were as follows: MA (120 grams), AA (60 grams, PS 850 (30 grams), methylethyl ketone (315 grams), AIBN (0.5 grams).

The solution was tumbled in a constant temperature bath for 16 hours at 55° C.

EXAMPLE 25

The procedure of Example 23 was repeated. The charges of components were as follows: MA (100 grams), AA (75 grams), PS 850 (20 grams), methylethyl ketone (292.5 grams), AIBN (0.5 grams).

The solution was tumbled in a constant temperature bath for 16 hours at 55° C.

EXAMPLE 26

The procedure of Example 23 was repeated. The charges of components were as follows: MA (100 grams), AA (75 grams), PS 850 (30 grams), methylethyl ketone (307.5 grams), AIBN (0.5 grams).

The solution was tumbled in a constant temperature bath for 16 hours at 55° C.

Examples 27-30 describe the preparation of vinyl-silicone copolymers possessing ionic functionality, which are the waterborne analogues of Examples 23-26.

EXAMPLES 27-30

Waterborne Analogues of Examples 23-26

A 100 gram portion of each of the 30% solids solution polymers from Examples 23-26 (these were run at ten times the quantity described above and diluted to 30% solids with IPA) was added to a solution of 12.1 grams of concentrated ammonium hydroxide in 100 grams of deionized water. The level of NH$_4$OH (0.2 mole) was in excess of that required to fully neutralize the carboxylic acid functionality present in the solution polymer (e.g., 0.16 equiv. in Example 25 from the 11.5 grams acrylic acid (AA) present). The organic solvents were stripped from the resulting viscous solutions on a rotary evaporator at 50° C. using an aspirator vacuum to yield 21 to 23% solids aqueous solutions. Five grams of each aqueous solution was diluted to 10% solids with 4 grams of deionized water and 1 gram of diethylene glycol monohexyl ether. The resultant solutions were then coated, dried, conditioned, and tested following the procedure set forth above for the solvent borne coatings of Examples 1-26. The test results and formulations for these coatings are reported in Table II as Examples 27-30, respectively.

Examples 31-37 describe the preparation of block vinyl-silicone copolymers according to the method of the present invention.

EXAMPLE 31

The procedure of Example 1 was repeated. The charges of components were as follows: MA (6.0 grams), AA (3.0 grams), HS-PDMS-SH (1.0 grams) prepared according to Example B, methyl ethyl ketone (16.0 grams), AIBN (0.55 grams).

The solution was tumbled in a constant temperature bath for 16 hours at 55° C.

EXAMPLE 32

The procedure of Example 1 was repeated. The charges of components were as follows: MA (6.0 grams), AA (3.0 grams), HS-PDMS-SH (1.0 grams) prepared according to Example B, methyl ethyl ketone (16.0 grams), AIBN (0.75 grams).

The solution was tumbled in a constant temperature bath for 16 hours at 55° C.

EXAMPLE 33

The procedure of Example 1 was repeated. The charges of components were as follows: MA (5.7 grams), AA (2.8 grams), HS-PDMS-SH (1.5 grams) prepared according to Example B, methyl ethyl ketone (16.0 grams), AIBN (0.75 grams).

The solution was tumbled in a constant temperature bath for 16 hours at 55° C.

EXAMPLE 34

The procedure of Example 1 was repeated. The charges of components were as follows: MA (5.7 grams), AA (2.8 grams, HS-PDMS-SH (1.5 grams) prepared according to Example B, methyl ethyl ketone (16.0 grams), AIBN (0.50 grams).

The solution was tumbled in a constant temperature bath for 16 hours at 55° C.

EXAMPLE 35

The procedure of Example 1 was repeated. The charges of components were as follows: MA (11.0 grams), AA (6.0 grams), HS-PDMS-SH (3.0 grams) prepared according to Example A, ethyl acetate (30.0 grams), AIBN (0.06 gram).

The solution was tumbled in a constant temperature bath for 40 hours at 55° C.

EXAMPLE 36

The procedure of Example 1 was repeated. The charges of components were as follows: MA (10.0 grams), AA (5.0 grams), HS-PDMS-SH (5.0 grams) prepared according to Example A, ethyl acetate (30.0 grams), AIBN (0.06 grams).

The solution was tumbled in a constant temperature bath for 40 hours at 55° C.

EXAMPLE 37

The procedure of Example 1 was repeated. The charges of components were as follows: MA (9.0 grams), AA (4.0 grams), HS-PDMS-SH (7.0 grams) prepared according to Example A, ethyl acetate (30.0 grams), AIBN (0.06 gram).

The solution was tumbled in a constant temperature bath for 40 hours at 55° C.

While this invention has been described in connection with specific embodiments, it should be understood that it is capable of further modification. The claims herein are intended to cover those variations which one skilled in the art would recognize as the chemical equivalent of what has been described here.

TABLE II

| Example | Formulation (Parts by weight) | Ink Receptivity | Tape | Release (Newtons Per Decimeter) | | | Readhesion (Percentage Of Initial Adhesion) | |
|---|---|---|---|---|---|---|---|---|
| | | | | Immediate | 2 days/Room Temperature | 2 days/65° C. | 2 days/Room Temperature | 2 days/65° C. |
| 1 | 60 MA 30 AA 15 PS 849 | P | A | 0.17 | 0.66 | 1.16 | 69 | 66 |
| 2 | 60 MA 30 AA 30 PS 849 | P | A | 0.33 | 0.50 | 0.50 | 72 | 47 |
| 3 | 60 MA 30 AA 15 PS 850 | F | A | 0.50 | 2.48 | 1.49 | 91 | 93 |
| 4 | 60 MA 30 AA 30 PS 850 | G | A | 0.33 | 1.00 | 1.49 | 91 | 100 |
| 5 | 45 MA 35 NVP 5 AA 15 PS 849 | E | B | 0.66 | 1.65 | 9.90 | 63 | 34 |
| 6 | 45 MA 35 NVP 5 AA 30 PS 849 | E | B | 0.50 | 1.16 | 2.15 | 46 | 21 |
| 7 | 45 MA 35 NVP 5 AA 15 PS 850 | E | B | 3.80 | 17.5 | 36.3 | 68 | 71 |
| 8 | 45 MA 35 NVP 5 AA 30 PS 850 | E | B | 0.66 | 12.2 | 25.2 | 48 | 42 |
| 9 | 60 MA 30 AA 5 PS 850 | E | A | 0.9 | 15.5 | 41.6 | 87 | 102 |
| 10 | 60 MA 30 AA 10 PS 850 | E | A | 0.99 | 8.3 | 13.5 | 93 | 98 |
| 11 | 60 MA 30 AA 15 PS 850 | E | A | 0.83 | 2.0 | 2.0 | 87 | 80 |
| 12 | 60 MA 30 AA 20 PS 850 | E | A | 0.66 | 1.2 | 1.65 | 87 | 81 |
| 13 | 50 MA 37.5 AA 5 PS 850 | E | A | 0.66 | 3.9 | 9.7 | 89 | 88 |
| 14 | 50 MA 37.5 AA 15 PS 850 | E | A | 0.50 | 1.3 | 2.3 | 92 | 55 |
| 15 | 45 MA 45 AA 5 PS 850 | E | A | 0.50 | 4.6 | 9.2 | 86 | 90 |
| 16 | 45 MA 45 AA 15 PS 850 | E | A | 0.50 | 1.6 | 4.1 | 79 | 94 |
| 17 | 90 MA 10 AA 10 PS 850 | P | C | 1.15 | 2.0 | 2.5 | 115 | 83 |
| 18 | 90 MA 10 DEAEMA 10 PS 850 | P | C | 0.50 | 1.3 | 0.7 | 95 | 85 |
| 19 | 90 BMA 10 MAA 10 PS 850 | P | C | 0.83 | 2.1 | 3.3 | 88 | 83 |
| 20 | 90 BMA | P | C | 0.83 | 1.3 | 3.0 | 70 | — |

TABLE II-continued

| Example | Formulation (Parts by weight) | Ink Receptivity | Tape | Release (Newtons Per Decimeter) Immediate | Release 2 days/Room Temperature | Release 2 days/65° C. | Readhesion (Percentage Of Initial Adhesion) 2 days/Room Temperature | Readhesion 2 days/65° C. |
|---|---|---|---|---|---|---|---|---|
| 21 | 10 DEAEMA 10 PS 850 90 MMA | P | C | 1.65 | 1.8 | 2.8 | 85 | 88 |
| 22 | 10 MAA 10 PS 850 90 MMA | P | C | 0.5 | 1.0 | 2.0 | 75 | 75 |
| 23 | 10 DEAEMA 10 PS 850 60 MA | G | A | 1.7 | 9.4 | 17.5 | 79 | 83 |
| 24 | 30 AA 10 PS 850 60 MA | G | A | 0.7 | 5.0 | 6.6 | 87 | 91 |
| 25 | 30 AA 15 PS 850 50 MA | E | A | 0.5 | 1.5 | 2.1 | 88 | 87 |
| 26 | 37.5 AA 10 PS 850 50 MA | E | A | 0.5 | 1.2 | 1.8 | 74 | 67 |
| 27 | 37.5 AA 15 PS 850 waterborne analogue of Example 23 | G | A | 0.8 | 8.6 | 32.5 | 96 | 106 |
| 28 | waterborne analogue of Example 24 | G | A | 1.0 | 5.6 | 20.0 | 94 | 91 |
| 29 | waterborne analogue of Example 25 | G | A | 0.5 | 1.0 | 1.8 | 79 | 78 |
| 30 | waterborne analogue of Example 26 | E | A | 0.5 | 0.7 | 2.1 | 71 | 86 |
| 31 | 60 MA 30 AA 10 HS-PDMS-SH | G | A | 0.4 | 7.1 | 13.5 | 60 | 51 |
| 32 | 60 MA 30 AA 10 HS-PDMS-SH | F | A | 0.3 | 7.5 | 12.7 | 67 | 48 |
| 33 | 57 MA 28 AA 15 HS-PDMS-SH | F | A | 0.3 | 6.1 | 10.1 | 60 | 49 |
| 34 | 57 MA 28 AA 15 HS-PSMS-SH | F | A | 0.3 | 6.9 | 10.0 | 56 | 54 |
| 35 | 55 MA 30 AA 15 HS-PDMS-SH | E | A | 0.7 | 1.80 | 2.80 | 89 | 71 |
| 36 | 50 MA 25 AA 25 HS-PDMS-SH | E | A | 0.3 | 0.7 | 1.30 | 71 | 54 |
| 37 | 45 MA 20 AA 35 HS-PDMS-SH | E | A | 0.3 | 0.7 | 1.0 | 75 | 50 |

We claim:

1. A method of making silicone-vinyl copolymer which comprises:
   (a) mixing (1) free radically polymerizable monomer mixed, if needed, with sufficient solvent to produce a charge which possesses a net dielectric constant greater than about 2.5, (2) a mercapto functional silicone compound represented by the formula

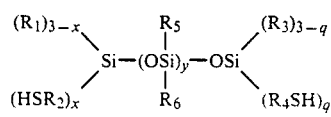

wherein
$R_1$ are monovalent moieties which can independently be the same or different and are selected from the group consisting of alkyl, aryl, alkaryl, alkoxy, alkylamine, hydroxyl, hydrogen, and fluoroalkyl;

$R_2$ can independently be the same or different and are divalent linking groups;

$R_3$ are monovalent moieties which can independently be the same or different and are selected from the group consisting of alkyl, aryl, alkaryl, alkoxy, alkylamino, hydroxyl, hydrogen, and fluoroalkyl;

$R_4$ can independently be the same or different and are divalent linking groups;

$R_5$ are monovalent moieties which can independently be the same or different and are selected from the group consisting of alkyl, aryl, alkaryl, alkoxy, alkylamino, hydroxyl, hydrogen, fluoroalkyl and -ZSH, wherein Z is a divalent linking group;

$R_6$ are monovalent moieties which can independently be the same or different and are selected from the group consisting of alkyl, aryl, alkaryl, alkoxy, alkylamino, hydroxyl, fluoroalkyl, hydrogen, and -ZSH wherein Z is a divalent linking group;
wherein
x is an integer of 0-3;
y is an integer of 10 or greater;
q is an integer of 0-3;
$R_5$ comprises 0 to y -ZSH moieties;
$R_6$ comprises o to y -ZSH moieties; and
wherein at least one of the following is true:
q is an integer of at least 1;
x is an integer of at least 1;
$R_5$ comprises at least one -ZSH moiety;
$R_6$ comprises 0 to y-ZSH moieties; and
(3) an initiator capable of forming free radicals upon being subjected to a means of initiation wherein said free radicals are capable of abstracting the -ZSH hydrogen atoms of the mercapto functional silicone compound to form mercapto functional silicone free radicals,
wherein said mercapto functional silicone free radicals are capable of initiating free radical polymerization of said free radically polymerizable monomer to form a graft copolymer or block copolymer represented by the formula

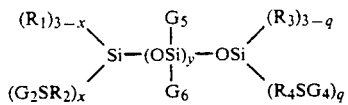

wherein
$G_5$ are monovalent moieties which can independently be the same or different selected from the group consisting of alkyl, aryl, alkaryl, alkoxy, alkylamino, fluoroalkyl, hydrogen, and -ZSH;
A is a vinyl polymeric segment or block consisting essentially of polymerized free radically polymerized monomer;
$G_6$ are monovalent moieties which can independently be the same or different selected from the group consisting of alkyl, aryl, alkaryl, alkoxy, alkylamino, fluoroalkyl, hydrogen, and -ZSA;
$G_2$ comprises A;
$G_4$ comprises A; and
$R_1$, $R_2$, $R_3$, $R_4$, x, q, y, and Z are as previously defined;
(b) initiating free-radical polymerization; and
(c) sustaining said free-radical polymerization until said vinyl-silicone copolymer is produced.

2. The method of claim 1 wherein the means of initiation is selected from the group consisting of thermolysis, photolysis, and catalysis.

3. The method of claim 1 wherein $R_5$ are monovalent moieties which can independently be the same or different and are selected from the group consisting of alkyl, aryl, alkaryl, alkoxy, alkylamino, hydroxyl, hydrogen and fluoroalkyl; and
$R_6$ are monovalent moieties which can independently be the same or different and are selected from the group consisting of alkyl, aryl, alkaryl, alkoxy, alkylamino, hydroxyl, fluoroalkyl and hydrogen.

4. The method of claim 1 wherein at least one $R_5$ moiety or at least one $R_6$ moiety comprises -ZSH.

5. A coated sheet material comprising:
(a) a flexible sheet; and
(b) a release coating covering at least a portion of one major surface of said flexible sheet wherein said release coating comprises a copolymer formed according to the method of claim 1, wherein A comprises at least about 40 weight percent of the copolymer and possesses a Tg or Tm above about $-20°$ C., and wherein a silicone segment of the copolymer has a number average molecular weight above about 1000 and wherein the silicone segment is present at a weight percent great enough to provide said copolymer with a surface release value not greater than about 50 Newtons/dm.

6. The coated sheet material of claim 5 wherein the silicone segment has a number average molecular weight of about 1000 to about 20,000.

7. The coated sheet material of claim 5 wherein the silicone segment has a number average molecular weight of about 2,000 to about 15,000.

8. The coated sheet material of claim 5 wherein the silicone segment is present at a weight percent of about 2 to about 60 percent of said copolymer.

9. The coated sheet material of claim 5 wherein A is formed from monomers selected from the group consisting of methyl acrylate, acrylic acid, vinyl acetate, methyl methacrylate, N-vinyl 2-pyrrolidone, hydroxy propylacrylate, hydroxy ethyl acrylate, styrene, and mixtures thereof.

10. The coated sheet of claim 5 wherein A possesses ionic functionality.

11. The coated sheet material of claim 5 wherein said release coating is capable of being written on effectively with both solvent based and water based ink.

12. The coated sheet material of claim 5 wherein the release agent is on one side of the sheet and an adhesive is on the other side.

13. The coated sheet material of claim 12 wherein the adhesive is a normally tacky and pressure-sensitive adhesive.

14. A copolymer formed according to the method of claim 1.

* * * * *

UNITED STATES PATENT AND TRADEMARK OFFICE
CERTIFICATE OF CORRECTION

PATENT NO. : 5,032,460
DATED : July 16, 1991
INVENTOR(S) : Steven S. Kantner, Ramesh C. Kumar, Gilbert L. Eian It is certified that error appears in the above-identified patent and that said Letters Patent is hereby corrected as shown below:

Col. 37, line 35     "-ZSH" should read ---ZSA--

Signed and Sealed this

Twenty-fifth Day of May, 1993

Attest:

MICHAEL K. KIRK

Attesting Officer     Acting Commissioner of Patents and Trademarks